Figure 1:
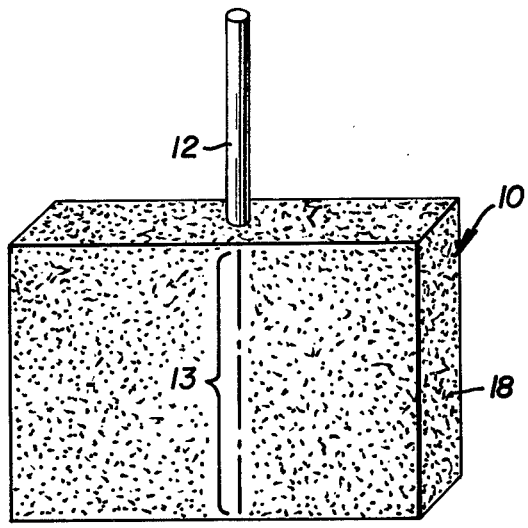

United States Patent [19]

Curlis, Jr.

[11] 4,162,518

[45] Jul. 24, 1979

[54] ANODE BODY FOR SOLID ELECTROLYTIC CAPACITOR

[75] Inventor: Horace E. Curlis, Jr., Anderson, S.C.

[73] Assignee: Union Carbide Corporation, New York, N.Y.

[21] Appl. No.: 824,722

[22] Filed: Aug. 15, 1977

[51] Int. Cl.² ............................................. H01G 9/00
[52] U.S. Cl. ...................................... 361/433; 29/570
[58] Field of Search ............... 361/433; 29/570, 25.18; 313/311

[56] References Cited

U.S. PATENT DOCUMENTS

| 3,345,545 | 10/1967 | Bourgault et al. | 361/433 |
| 3,686,535 | 8/1972 | Piper | 361/433 |
| 3,806,770 | 4/1974 | Voyles et al. | 361/433 |

FOREIGN PATENT DOCUMENTS 1083632  1/1955  France ..................................... 361/433

Primary Examiner—James W. Davie
Attorney, Agent, or Firm—Frederick J. McCarthy, Jr.

[57] ABSTRACT

A slab-shaped pressed anode body for electrolytic capacitors having a geometrical configuration which minimizes the effect of sintering induced warpage on subsequent manufacturing operations.

4 Claims, 13 Drawing Figures

U.S. Patent Jul. 24, 1979 Sheet 1 of 3 4,162,518

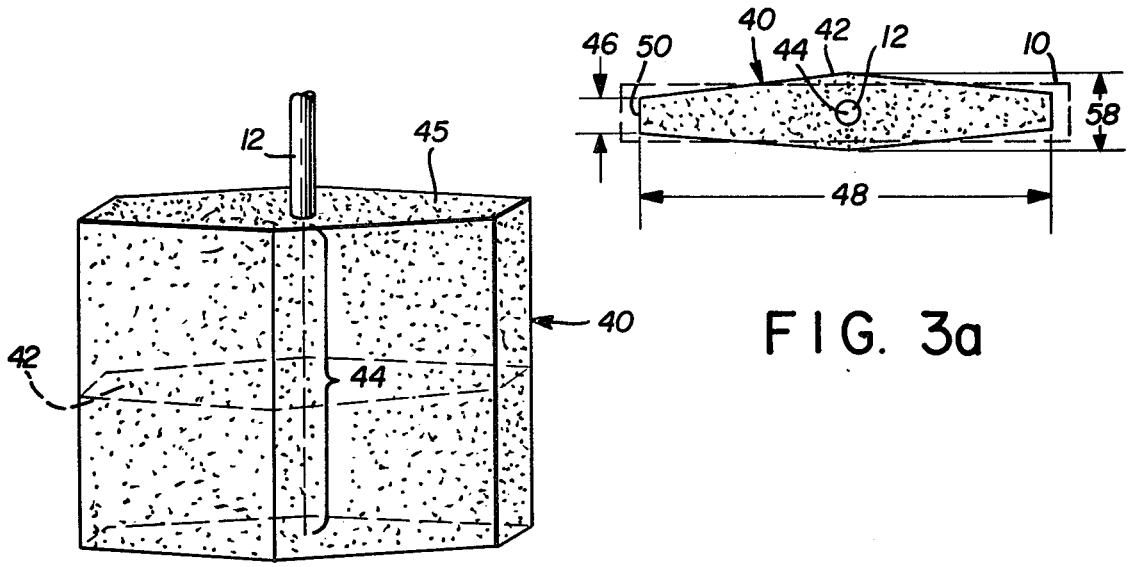
FIG. 3
FIG. 3a
FIG. 3b
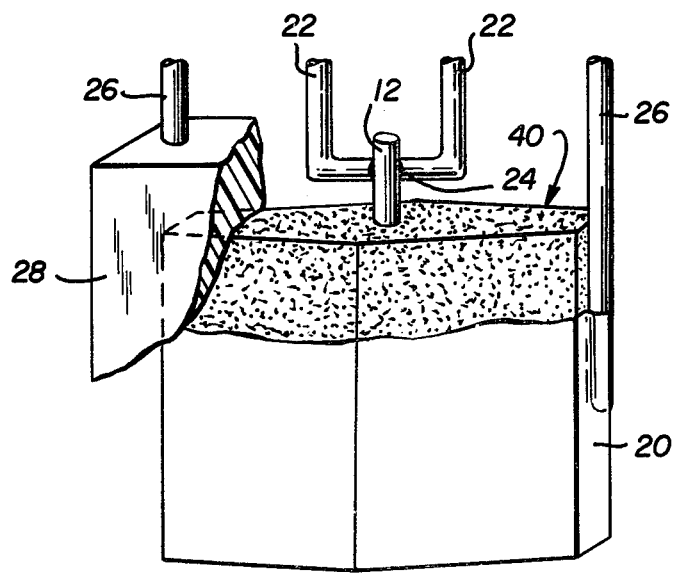
FIG. 4

ANODE BODY FOR SOLID ELECTROLYTIC CAPACITOR

The present invention relates to solid electrolytic capacitors. More particularly the present invention is directed to pressed anode bodies for solid electrolytic capacitors.

Solid electrolytic capacitors are well known to the art and are described for example in U.S. Pat. No. 3,166,693 H. E. Haring and R. L. Taylor, U.S. Pat. No. 2,936,514 R. J. Millard.

The anode elements used in such devices are prepared by forming bodies of pressed powder of an anodizeable metal, e.g., tantalum. The pressed bodies are thereafter heated to provide porous sintered bodies of anodizeable metal and these bodies are employed as anodes for electrolytic capacitors using known conventional techniques. It is frequently desirable to provide such anodes in a slab-like shape, e.g., of the type illustrated in U.S. Pat. No. 3,686,535-J. Piper, such anodes being also used in applications other than those described in the aforesaid patent, e.g., in molded epoxy cased capacitors. In the course of preparing such slab-like anode bodies, a pressed slab-like shape of pressed anodizeable metal powder is prepared and subsequently heated to provide a sintered body as noted above. In the course of such sintering the slab-like pressed metal bodies frequently deform, e.g., warp. The cause of the warpage is generally believed to be lack of uniformity of the density of the pressed metal in different parts of the body. While the warpage does not detrimentally affect the electrical properties of the ultimate capacitor bodies, there are serious disadvantages, e.g., lead wire misalignments, incomplete epoxy casing, inability of the anode to fit predetermined capacitor package dimensions.

It is therefore an object of the present invention to provide a pressed anode body of anodizeable metal in which the deleterious effects of warpage from deformation due to sintering are minimized.

Figure 2:
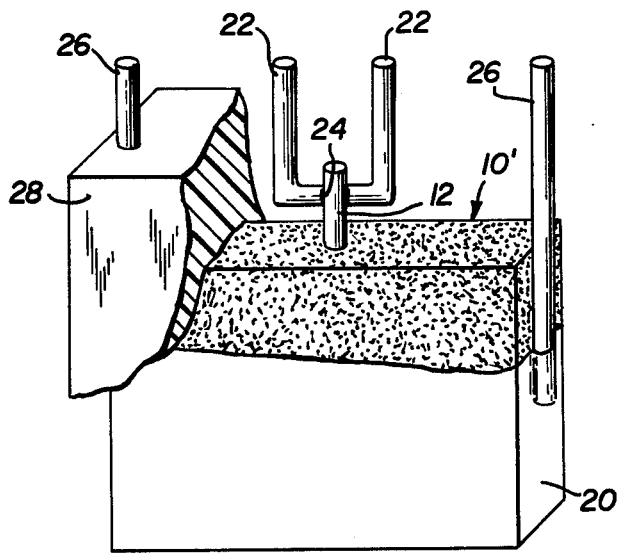
Figure 1A:
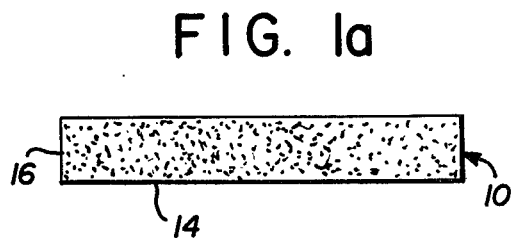
Figure 2B:
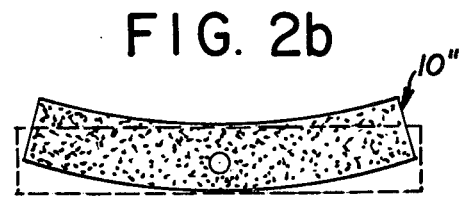
Figure 2A:
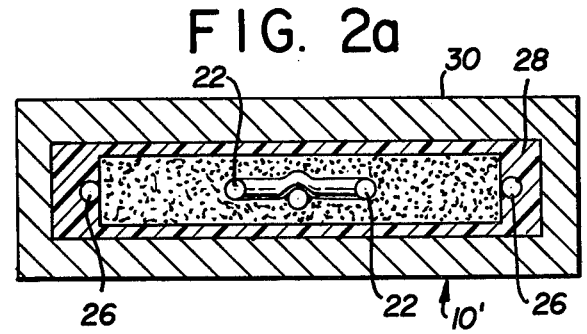
Figure 2C:
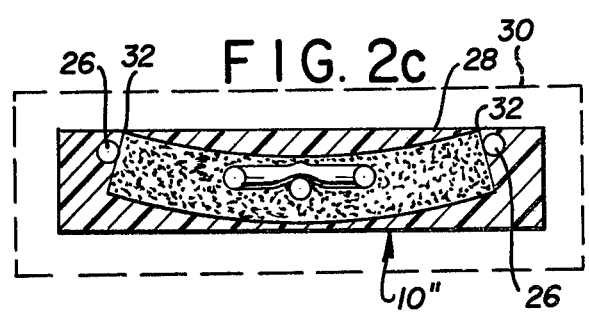

Other objects will be apparent from the following description and claims taken in conjunction with the drawing wherein FIGS. 1 and 1(a) show a conventional prior art slab-shaped pressed anode body, FIGS. 2 to 2(c) show a conventional prior art solid electrolytic capacitor having a slab-shaped anode and epoxy case, FIGS. 3-3(b), 4, 4(a) and 5, 5(a) show embodiments of the present invention.

An anode body in accordance with the present invention comprises a slab-shaped anode body of anodizeable metal having relatively narrow side surfaces and having a substantially symmetrical elongate cross-section perpendicular to its shorter central axis, the length of the cross-section being substantially greater than the width of the cross-section, the width varying from a maximum at its center to a minimum at the relatively narrow sides of the anode body.

With reference to the drawing, FIGS. 1 and 1(a) show a conventional prior art pressed anode body 10, e.g., formed of pressed tantalum powder having an anode riser wire 12 joined thereto, by being pressed therein or welded thereto, at its shorter central longitudinal axis 13, in the course of conventional processing. The anode body 10 has a rectangular cross-section as shown in FIG. 1(a) with a length 14 substantially larger, e.g., 2 to 10 times larger than its width 16. The height 18 of the pressed anode body 10 is ordinarily usually about 1 to 8 times the width 16. The relatively narrow opposed side surfaces of the pressed anode body 10 are substantially parallel as illustrated.

With reference to FIG. 2 in accordance with known techniques such as those described in U.S. Pat. No. 3,093,883 pressed anode body 10 is sintered to provide a sintered porous body 10' which is anodized and provided with an electrolyte layer which is coated with an electrically conductive material, e.g., a silver or copper solder termination 20. Anode leads 22 are welded at 24 to another riser 12 and negative leads 26 are soldered to termination 20 to provide an electrical capacitor which is commonly provided with an epoxy case 28. The epoxy casing can be conventionally accomplished by well known techniques using a mold 30 as shown in FIG. 2(a) in which the electrical capacitor is centrally aligned, e.g., by rigid placement of previously attached lead wires 22 and 26, and in some cases by the additional use of conventional retractable pin arrangements built into the mold itself. The mold 30 is conventionally filled with liquid epoxy which is caused to solidify in situ and form epoxy case 28. FIGS. 2 and 2(a) represent an ideal situation wherein the sintered slab-like anode body 10' has not been distorted during sintering. Quite frequently, however, the pressed anode body is distorted, e.g., warped, during the course of conventional sintering to provide a shape such as indicated at 10'' in FIG. 2(b). Where a distorted shape such as 10'' is placed and aligned in a mold 30, such as shown in FIG. 2(c), the relatively sharp edges 32 closely approach, and possibly "show-through" the epoxy case 30 which is highly undesirable. Furthermore the anode body 10'' can be damaged by stresses imparted to it if it comes directly in contact with rigid sections of mold 30.

Figure 4A:
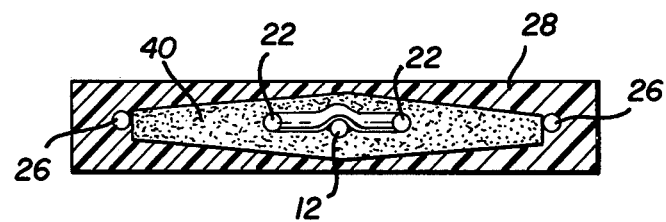

This undesirable situation is avoided in the present invention by the use of a slab-like pressed anode body such as shown at 40 in FIG. 3(a) and 3(b) wherein the elongate cross-section 42, perpendicular to the shorter central longitudinal axis 44 is symmetrical about axis 44 and has a width 58 which is substantially less than the length 48, e.g., ½ to 1/10, and varies from a maximum at the central axis 44 to a minimum at the side surfaces 50 most remote from the central axis 44. Such a slab-like shape resists warpage during sintering. The minimum width 46 should be from about 0.2 to 0.9 the maximum width 58 at the central axis, preferably 0.4 to 0.7 times the maximum width. Under such conditions the warping of the anode body, in the course of sintering at the usual temperatures, e.g., about 1600° C. to 2200° C., which may occur as indicated at 60 in FIG. 3(b) can easily be accommodated in an epoxy cased capacitor arrangement similar to that of FIG. 2(c). In the epoxy cased capacitor device of FIG. 3(b), which is further illustrated in FIGS. 4 and 4(a), no edge of the anode body detrimentally approaches the surface of epoxy case and substantial alignment of the capacitor leads is maintained. FIG. 3(a) represents a technique for providing a pressed anode body 40 in accordance with the present invention having the same ultimate electrical properties of a conventional slab-shaped anode body 10. With reference to FIG. 3, the same weight of anodizeable metal powder is used in forming anode body 40 as used in anode body 10 and the height of both bodies 40 and 10 are the same. The cross-section of body 40 is adjusted, using a suitably shaped die and conventional pressing techniques, to a hexagonal shape as shown in FIG. 3(a) in conformance with the present invention as described above. All processing conditions used in making body 40, and subsequent processing steps in making a final capacitor such as shown in FIGS. 4 and 4(a), are the same as for anode body 10.

Figure 5:
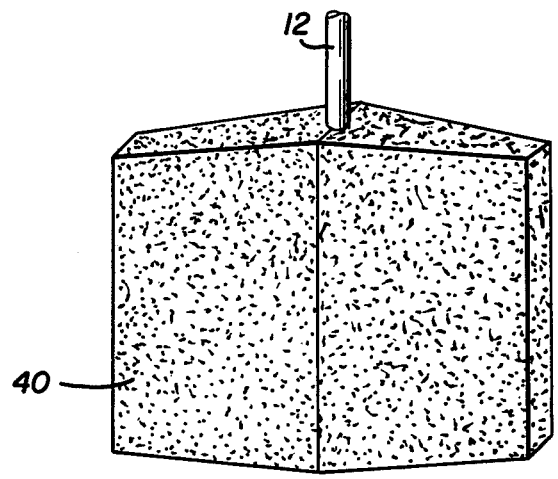
Figure 5A:
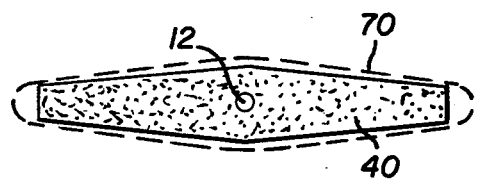

A hexagonal cross-section described above is the preferred embodiment of the present invention due to ease of construction, however, a substantially elliptical curvilinear cross-section as shown at 70 in FIG. 5(a) and other cross-sections generally circumscribing a hexagonal cross-section in accordance with the present invention are satisfactory. Also, anode bodies having somewhat beveled sloping upper and lower surfaces as shown in FIG. 5(b) are in accordance with the present invention.

A further advantage of the pressed anode body of the present invention is the increased width provided at the central axis which facilitates the desired alignment of the anode riser during the formation of the pressed anode body and increases the ruggedness of the anode body at the joint with the riser wire. This is significant in view of the small sizes of most capacitor anodes. By way of example, a typical pressed anode body in accordance with the present invention has the following dimensions:

Height 0.225 inch
Cross-section length 0.310 inches
Maximum cross-section width 0.050 inches
Minimum cross-section width 0.030 inches

What is claimed is:

1. A slab shaped anode body of pressed anodizeable metal powder having side surfaces which are relatively narrow with respect to the length of the anode body measured between the side surfaces and having a substantially symmetrical elongate cross-section perpendicular to its shorter central axis, the length of said cross-section being substantially greater than the width of said cross-section, said width varying from a maximum at its center to a minimum at the relatively narrow sides of the anode body.

2. A slab-shaped pressed anode body in accordance with claim 1 wherein said cross-section is hexagonal in shape.

3. A slab-shaped pressed anode body in accordance with claim 1 wherein said anodizeable metal is tantalum.

4. A solid electrolyte capacitor comprising a slab-shaped anode body of pressed anodizeable metal powder having side surfaces which are relatively narrow with respect to the length of the anode body measured between the side surfaces and having a substantially symmetrical elongate cross-section perpendicular to its shorter central axis, the length of said cross-section being substantially greater than the width of said cross-section, said width varying from a maximum at its center to a minimum at the relatively narrow sides of the anode body; an anode riser wire joined to said slab-shaped body extending in alignment with said shorter central axis; an anode terminal wire affixed to said riser wire; an electrolytic layer formed on said slab-shaped anode body; a conductive metal coating on said electrolyte layer; a negative terminal lead attached to said metal layer; and an epoxy case molded about said capacitor body.

* * * * *